United States Patent

Hamaekers et al.

Patent Number: 5,139,241
Date of Patent: Aug. 18, 1992

[54] RESILIENT MOUNT FOR A PISTON ENGINE

[75] Inventors: Arno Hamaekers, Gorxheimertal; Arnold Simuttis, Bad Kreuznach; Axel Rudolph, Bensheim; Tillman Freudenberg, Weinheim, all of Fed. Rep. of Germany

[73] Assignee: Firma Carl Freudenberg, Weinheim/Bergstrasse, Fed. Rep. of Germany

[21] Appl. No.: 614,407

[22] Filed: Nov. 15, 1990

[30] Foreign Application Priority Data

May 15, 1990 [DE] Fed. Rep. of Germany ....... 4015528

[51] Int. Cl.$^5$ ........................... F16M 7/00; F16F 7/00
[52] U.S. Cl. ................... 267/140.12; 267/141.4; 267/140.11
[58] Field of Search ........... 267/35, 140.1 C, 140.1 R, 267/141.2, 141.3, 141.4, 141.5; 248/562, 636

[56] References Cited

U.S. PATENT DOCUMENTS

| | | | |
|---|---|---|---|
| 4,822,010 | 4/1989 | Thorn | 267/140.1 C |
| 4,838,529 | 6/1989 | Orikawa et al. | 267/140.1 C |
| 4,858,899 | 8/1989 | Saotome et al. | 267/141.4 X |
| 4,865,299 | 9/1989 | Goto | 267/140.1 C |
| 4,941,649 | 7/1990 | Funahashi et al. | 267/140.1 C |

FOREIGN PATENT DOCUMENTS

| | | |
|---|---|---|
| 0304349 | 2/1989 | European Pat. Off. . |
| 3619685 | 12/1987 | Fed. Rep. of Germany . |
| 0206838 | 9/1986 | Japan . |

Primary Examiner—Robert J. Oberleitner
Assistant Examiner—Peter M. Poon
Attorney, Agent, or Firm—Sprung Horn Kramer & Woods

[57] ABSTRACT

A resilient mount for a piston engine, in which two liquid-filled working chambers (1, 2) are provided that are bounded by elastically inflatable boundary walls and are connected by at least two connecting passageways arranged in parallel. The connecting passageways include a damping passageway (6) which is arbitrarily closable by a valve (7). The damping passageway (6) forms a duct and which is so dimensioned that the enclosed liquid mass enters into a relative vibrating movement in phase with the piston engine, when the piston engine operates at idle speed, with an amplitude which is greater than the amplitude of the movements of the engine, multiplied by the ratio of the displacement cross section of the inflatable boundary walls (3) and the cross sectional area of the damping passageway (6).

5 Claims, 5 Drawing Sheets

RESILIENT MOUNT FOR A PISTON ENGINE

BACKGROUND OF THE INVENTION

The invention relates to a hydraulically damped mount providing filled working chambers which are defined by elastically inflatable boundary walls and are connected to one another by at least two parallel-connected connecting passageways, the connecting passageways including a damping passageway which can be closed at will by a valve.

A rubber mount of this type is disclosed in the German Published Patent Application No. 36 19 685. The effective length of the passageway can be increased and reduced arbitrarily by operating a valve in order to achieve a damping action that reduces resonance effects over the widest possible frequency range. However, this arrangement is not very satisfactory in isolating vibrations which occur when the piston engine, supported by the mount, operates at its idle speed, because such vibrations are disturbingly perceptible in the body of the vehicle.

SUMMARY OF THE INVENTION

The principal object of the present invention is to further develop a rubber mount of this type to achieve good damping of road-caused, low-frequency vibrations as well as good isolation of vibrations having their source in the piston engine when it operates at idle speed.

This object, as well as other objects which will become apparent from the discussion that follows are achieved, in accordance with the present invention, by configuring the damping passageway as a duct or channel having such dimensions that, when the idle speed of the piston engine is reached, the enclosed mass of fluid enters into a relative movement, vibrating in phase with the engine, which is greater than the amplitude of the movements of the piston engine, multiplied by the ratio of the displacement cross section and the cross section of the damping passageway.

The term "displacement cross section," as used herein, refers to the action area of the flexural element—i.e., the elastically inflatable boundary walls—which operates in a piston-like manner during compression or expansion of the mount.

The degree of dynamic stiffness of the rubber mount when the idle speed is reached is consequently less than its stiffness when the engine is not running. The shaking movements caused by the piston engine operating at idle speed are therefore isolated in an excellent manner. Vibrational excursions of the engine amplified by resonance are therefore of little concern when this state of operation is reached. Operational safety is accordingly in no way endangered.

A technical article by Spurk/Andrä, "Theorie des Hydrolagers," published in Automobilindustrie 5/85, FIG. 3, page 554, discloses the fact that the dynamic stiffness in hydraulically damped rubber mounts of the type under discussion undergoes a reduction below the resonant frequency of the liquid mass contained in the duct. No mention is made in that article of utilizing this effect for the achievement of good isolation of idling vibrations.

In accordance with the principals of the present invention, this effect is utilized in a controlled manner and tuned in such a way that, when the supported piston engine reaches its idle speed, the rubber mount supporting the piston engine attains its maximum softness.

With regard to construction, it does not matter whether the valve is disposed in the working chamber, in the equalization chamber, or somewhere in between, because when it is actuated the damping passageway is shut off.

The damping passageway should have a cross section amounting to at least 100 square millimeters. The mass effect of the damping passageway is given by the formula:

$$\omega_o \times L/A,$$

where $\omega_o$ represents the density of the liquid contained in the damping passageway, L the length of the damping passageway, and A the cross section of the damping passageway.

In connection with the elasticity of the walls of the working chambers and the hydraulic displacement cross section thereof, it is thus possible to tune the system to a specific frequency using a passageway of great length and large cross section or of short length and small cross section. In accordance with the principals of the present invention, the damping passageway is preferably made with the largest possible cross section that is permitted by the design. Thus, upon the introduction of vibrations into the rubber mount, considerably greater masses of liquid, as compared to ordinary rubber mounts, are moved back and forth with comparatively lower velocity, causing the dynamic spring stiffness to diminish when the idle speed is reached. From this viewpoint it has proven to be desirable for the passageway to have a cross section of at least 100 mm$^2$. At speeds above the idle speed the damping passageway is closed by a valve and inactive. Only the connecting passageway that is parallel to the damping passageway is available for the movement of the fluid between the working chambers. This passageway, if of a duct-like configuration, is also preferably made as large as possible. For the reasons given above, this arrangement permits a good damping of vibrational excursions of the motor that are augmented by resonance.

The unloading valve should have a cross section that is at least as great as the cross section of the duct. With such a configuration it cannot additionally inhibit the relative movement of the fluid components that may be passing through. With regard to its external construction, the form of rubber mount can be based on that of the conventional hydraulic mount. In the latter arrangement the two working chambers are separated from one another by an essentially planar dividing wall and from the outside by rubber walls, at least one of which is of a hollow conical shape. The damping passageway in this case is usually surrounded by components of the dividing wall.

In the case of designs in which both working chambers are formed by recesses in a single rubber body which is disposed in the radial space between two supporting sleeves one surrounding the other, it has proven advantageous for the damping passageway to be formed at least partially by a cut-out in the outer supporting sleeve. It is in this manner that the desire for a large cross section and a great length of the damping passageway can best be satisfied. Such a cut-out can have at least one section extending substantially lengthwise of the supporting sleeve.

The valve is actuated such that the damping passageway is opened only when the idle speed of the piston engine is reached. In other states of operation of the piston engine the damping passageway is closed and only the passageway connected in parallel with the damping passageway is available for the vibration-caused movement back and forth of fluid between the two working chambers. The parallel-connected passageway is so dimensioned that, with good insulation, acoustically undesirable resonant movements of the supported piston engine are suppressed to a maximum extent. Baffled and channel-like configurations are possible; they can supplement the actual damping passageway from the design point of view, or they can be provided separately.

Further features, objects and advantages of the present invention will become apparent from the following description taken in conjunction with the accompanying drawings.

DESCRIPTION OF THE PREFERRED EMBODIMENTS

Figure 1:
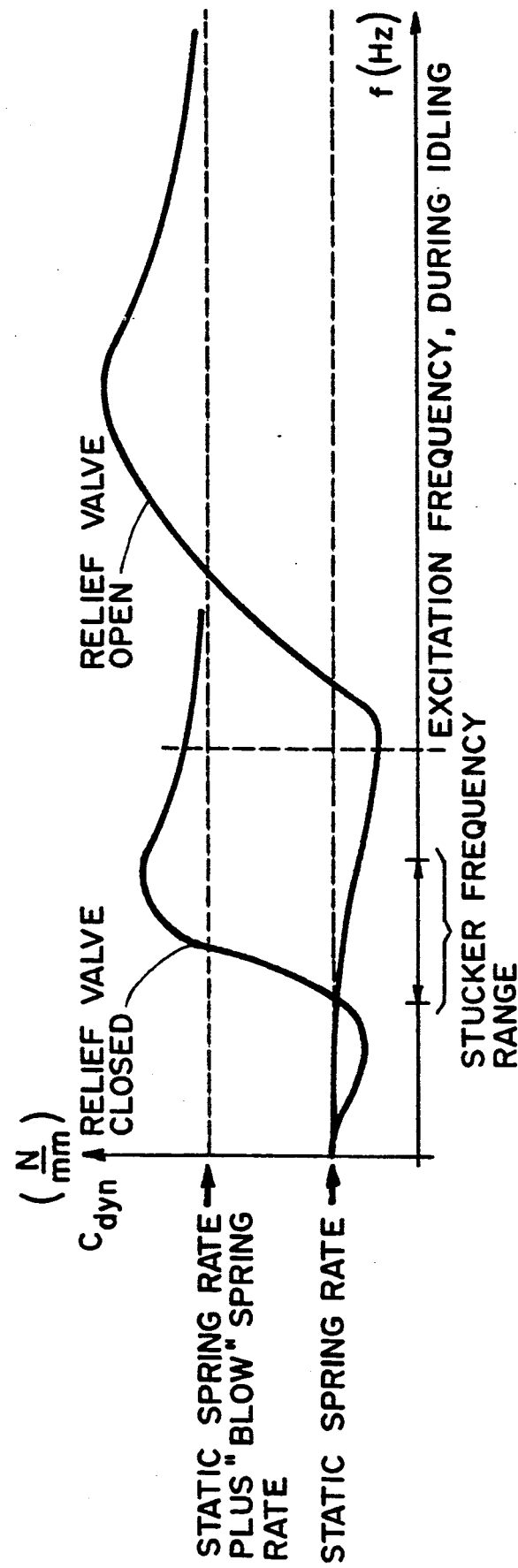
FIG. 1 is a diagram in which the dynamic stiffness of a rubber mount is plotted against the frequency.

In the diagram shown in FIG. 1, the dynamic stiffness of the rubber mount is plotted against the frequency of the vibrations introduced by a piston engine under normal operating conditions. The diagram shows two curves. The left curve represents the action of the rubber mount with the valve closed; the result is a stiff damping system in the Stucker frequency range. By opening the valve, the curve can be shifted toward higher frequencies to such an extent that the minimum stiffness coincides with the excitation frequency of the system when the supported piston engine is idling. The rubber mount thus becomes especially flexible and soft when the idle speed is reached, so that an optimum isolation from the idle-speed shaking movements of the piston engine is achieved.

Figure 2:
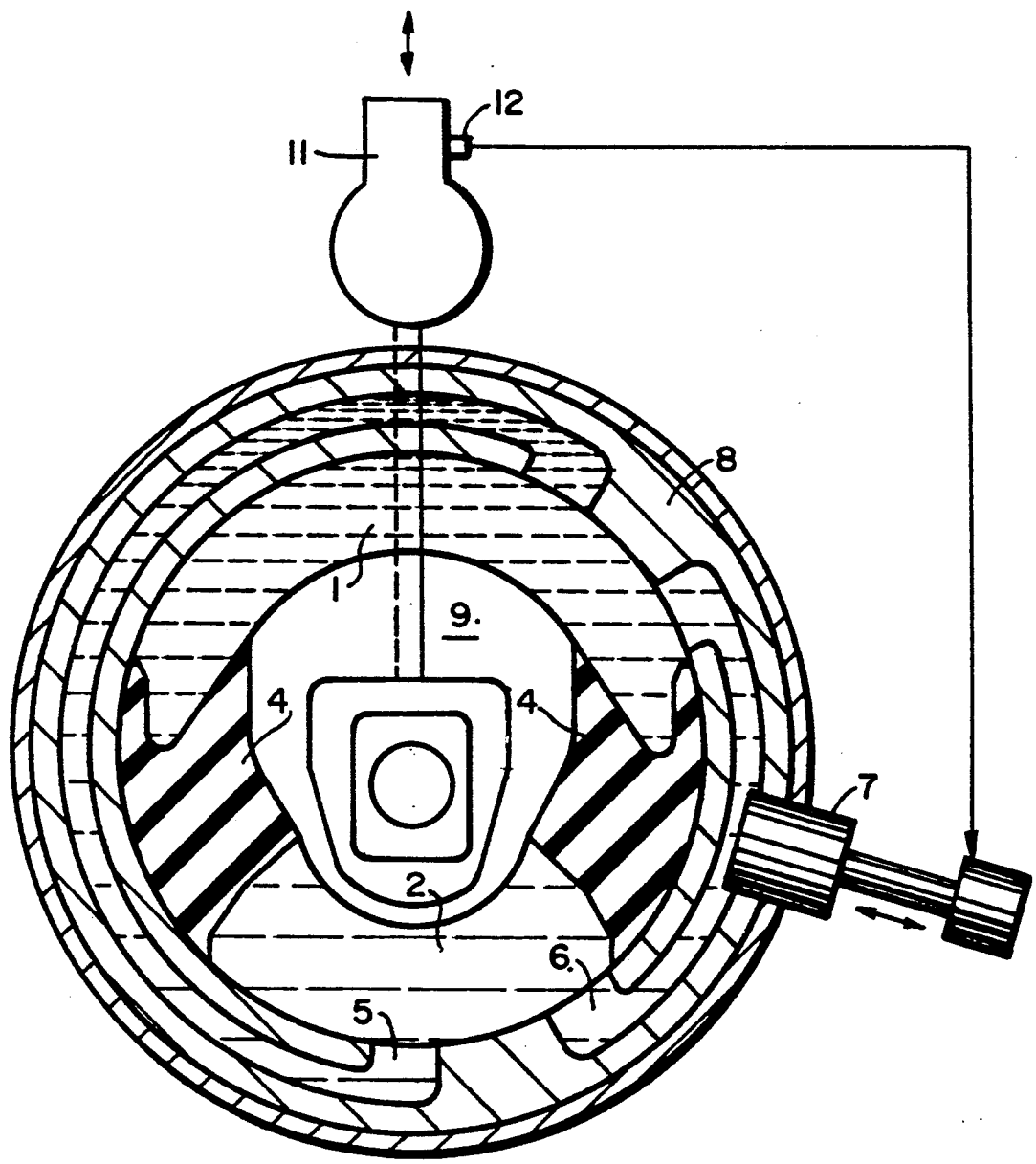
FIGS. 2 to 4 are cross sectional views of a plurality of preferred embodiments of the rubber mount according to the invention.

The external shape of the rubber mount shown in FIG. 2 conforms to the shape of a bushing mount. Metal part 9 is coaxially inside of metal part 8, thereby connecting in relative movement as they bear one against the other. The inside part 9 and the outside part 8 are joined together by a support body 4 of rubber-elastic material. The support body 4 fills the entire space between parts 8 and 9 except for the area filled by working chambers 1 and 2. Since these chambers are disposed in the interior and sealed off from the exterior, they are filled with a hydraulic fluid and are in liquid-conducting communication through a connecting passageway 5 and a damping passageway 6. This rubber mount, is intended for use with a piston engine. The engine, shown in outline at 11 is provided with a sensor 12 which produces a signal when the idle speed is reached. This signal, in turn, operates the valve 7 to open the damping passageway 6 to achieve optimal vibration buffering during idle. Under other operating conditions, however, the valve 7 closes the damping passageway 6.

Once the rubber mount is installed under its respective piston engine, the working chambers 1 and 2 are appropriately oriented in the direction of the vibrations that are to be absorbed. This direction is indicated by a double arrow in FIG. 2.

The rubber mount shown in FIG. 2 operates in the following manner:

When the supported piston engine operates at idle speed, the valve 7 opens and the working chambers 1 and 2 are in a fluid-carrying communication both through the connecting passageway 5 and through the damping passageway 6. Running transversely of the axis of the inner part 9 and outer part 8, the face ends of the working chambers 1 and 2 are bounded by thin elastic walls (identified as elements 3 in FIG. 5) which form parts of the rubber-elastic supporting body 4. The walls accordingly perform an alternating elastic bulge upon the introduction of the operation-caused vibrations. The synchronized emergence of this bulge ensures that the fluid masses contained in the connecting passageway 5 and those contained in the damping passageway 6 do not undergo any relative displacement following the vibrations which excite the mount. Depending upon the frequency of the introduced vibrations, and depending on the magnitude of the masses contained in the passageways and the elasticity of the walls, a more or less pronounced phase shift will occur between the exciting vibration and the relative movement of the fluid masses. This manner of operation is known in the art.

In a departure from what is known, a damping passageway 6 is provided which is opened by the actuation of a valve 7 only when the idle speed is reached. The dimensions of this passageway enable the enclosed fluid mass, when the valve 7 is open, to enter into a relative movement, vibrating in phase with the movement of the engine. This fluid movement has an amplitude which is greater than that of the piston engine's movements multiplied by the ratio of the displacement cross section of the inflatable boundary walls—i.e., of the walls 3 described above—and the cross sectional area of the damping passageway 6. When the idle speed is reached, the rubber mount therefore is "softer" than it is when the engine is not running. Thus the shaking of the engine that occurs when the idle speed is reached can be very well isolated.

When the engine operates at higher speeds, the damping passageway is closed by actuating the valve. In this case the only connection between the working chambers is the connecting passageway 5. The rubber mount accordingly undergoes a certain "hardening" as regards its flexibility. This hardening is made as slight as possible in order to make the engine more quiet and vibration-free. Regardless of this automatic feature, the connecting passageway is so configured that the fluid mass enters into a resonance that is 180 degrees out of phase upon the occurrence of critical engine vibrations. Corresponding vibrations are therefore well damped.

Figure 3:
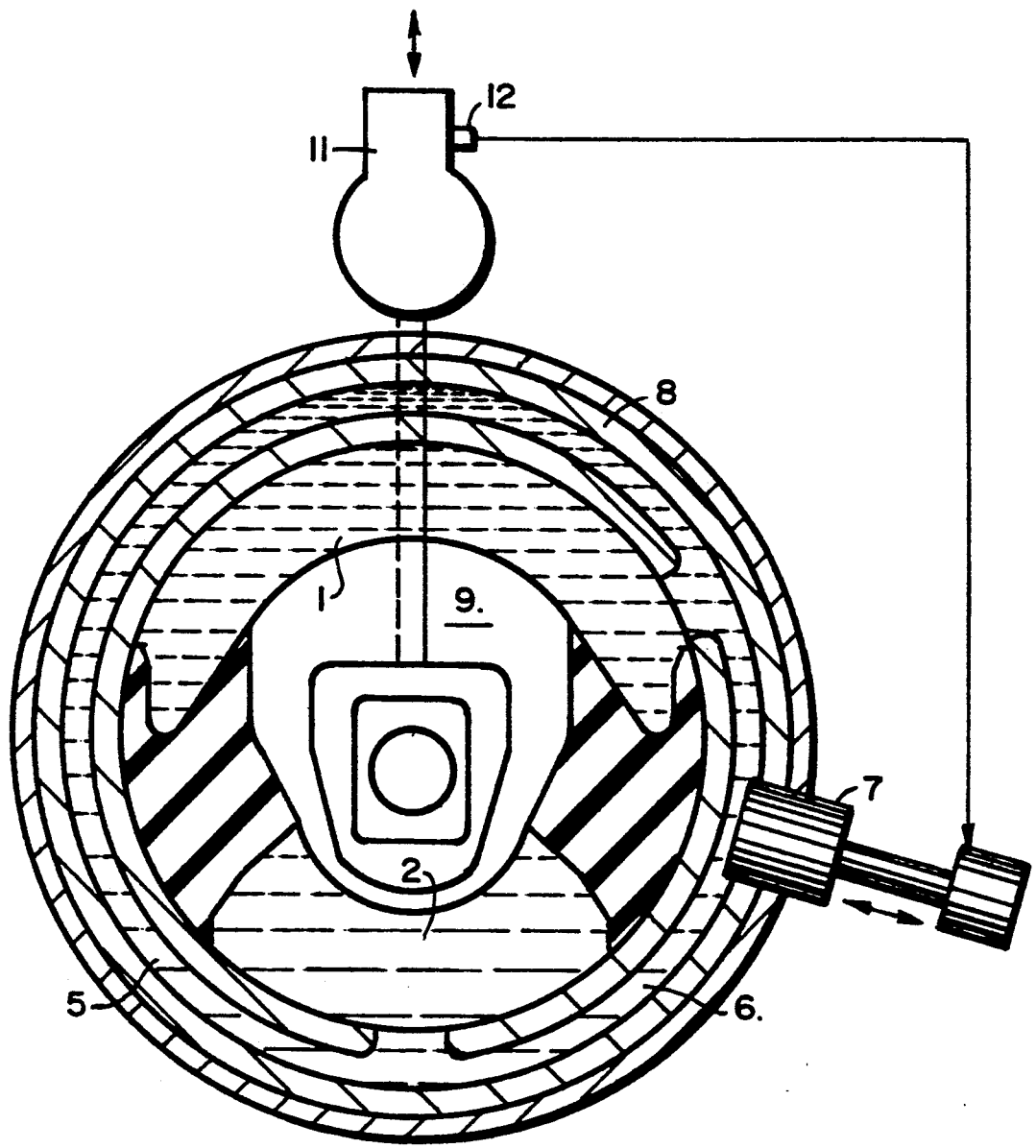

The embodiment shown in FIG. 3 differs essentially from the one described above in that the connecting passageway 5 and the damping passageway 6 are merged with one another and have common inlet and outlet openings. This key difference greatly simplifies the manufacturing process. The operation of the rubber mount is otherwise the same as that described above.

Figure 4:
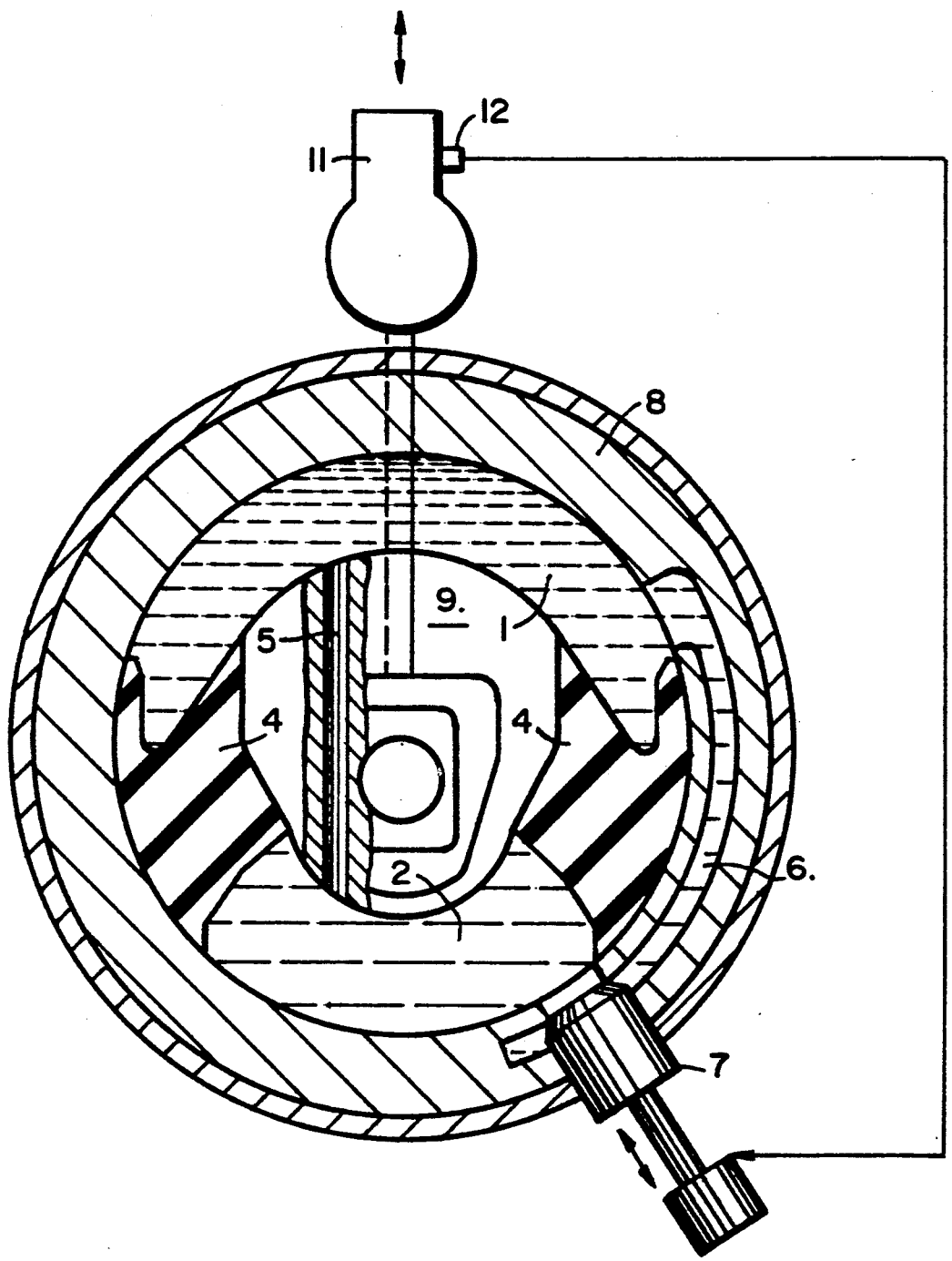

FIG. 4 differs from the one described above chiefly in that the connecting passageway 5 is associated with the inner part 9 and runs parallel with the direction of the vibrations intended to be absorbed. The direction of these vibrations is again indicated by a double arrow in the illustration. The parallelism achieved results in a better response in the damping effectiveness of the connecting passageway 5.

Figure 5:
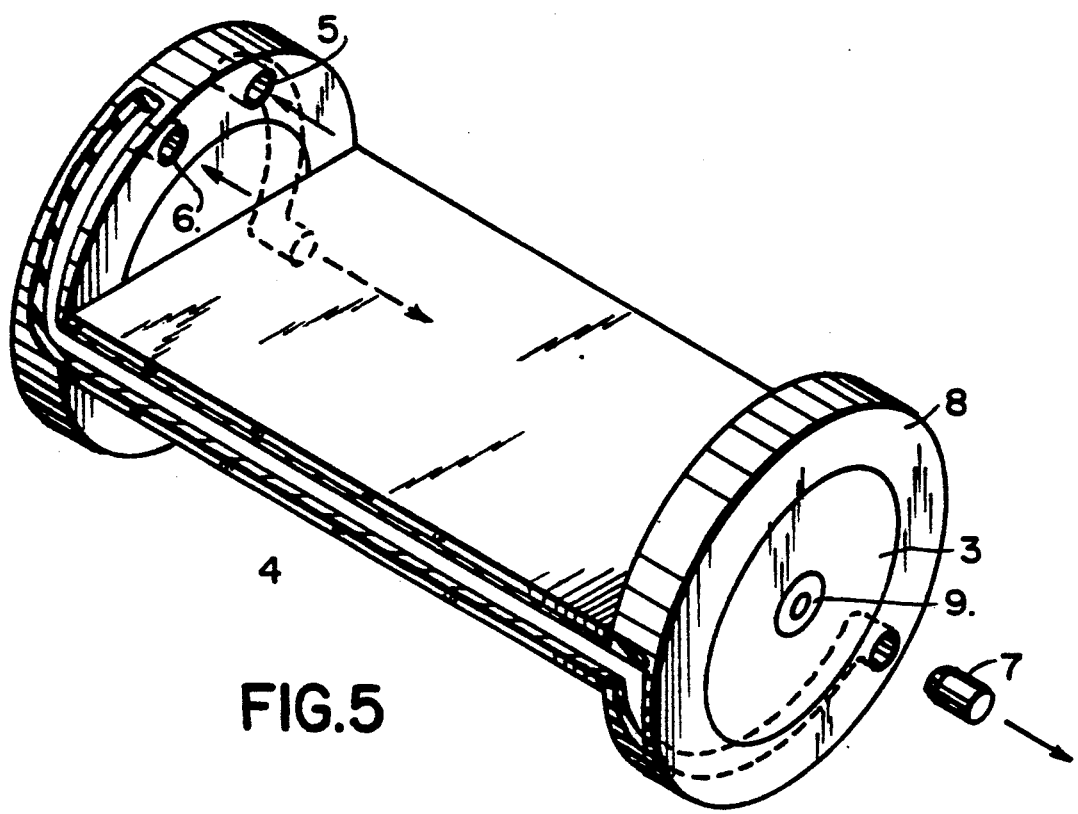
FIG. 5 is an exemplary embodiment of a unit which can be used in a rubber mount of cylindrical external shape.

FIG. 5 is a perspective top view of a component which can be used in manufacturing a rubber mount of the bushing type. The embodiments in FIGS. 1 to 4 described above correspond to this type.

The component shown in FIG. 5 consists essentially of the inner part 9 and the outer part 8, each made of metal and bonded together by a supporting body 4 of rubber. The supporting body 4 can be bonded to the inner part 9 and outer part 8 by direct vulcanization.

The outer part 8 encloses a connecting passageway 5 and a damping passageway 6. Both are formed by recesses in the outer part 8. The damping passageway 6 has two sections merged with one another, one extending essentially circumferentially in the outer part 8, and the other extending essentially parallel to the length of the inner part 9 (formed by a supporting sleeve). The actuating element of valve 7 is indicated schematically. It can be associated with the damping passageway 6 in a manner different from the one represented. The elastic walls which close off the ends of the working chambers during the intended use are identified by 3. They form a single component of the supporting body 4 and consist of rubber.

Figure 6:
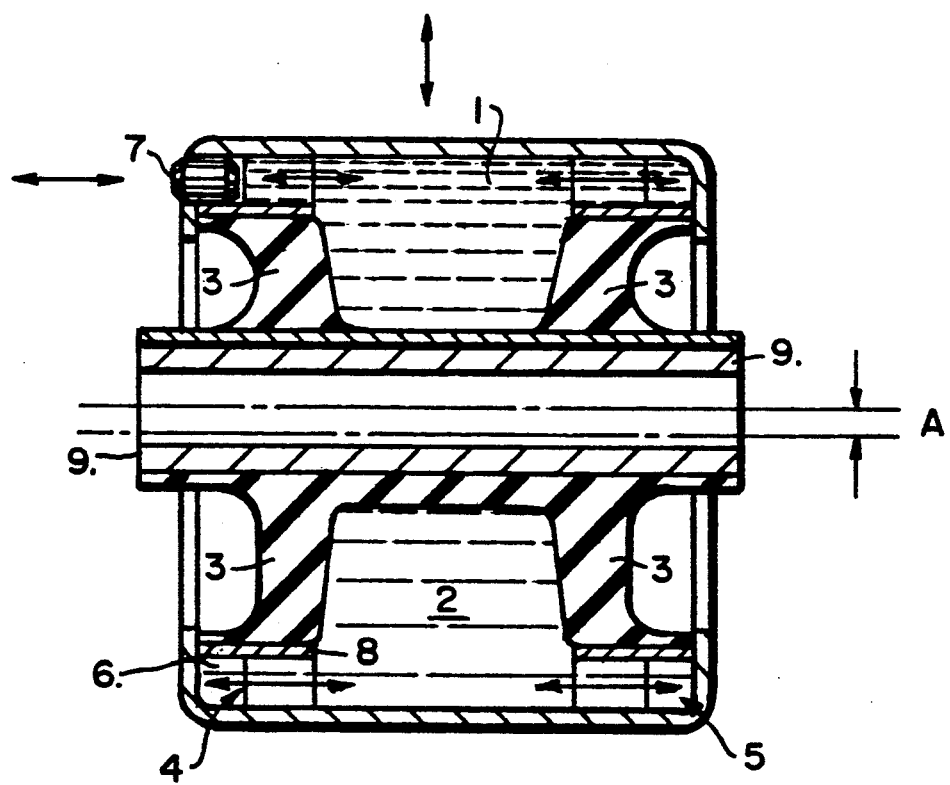
FIG. 6 a longitudinal section view of another preferred embodiment of the rubber mount according to the invention.

FIG. 6 shows a longitudinal cross section of a rubber mount which is also configured as a bushing mount. The inner part 9 consists of a tube which is surrounded on its entire length by the outer part 8 and is bonded together with the latter by the supporting body 4 of rubber-elastic material. The supporting body 4 contains working chambers 1 and 2 appropriately oriented in the direction of the vibrations to be absorbed; they are closed at the end by walls 3, filled with a hydraulic fluid, and joined together by a connecting passageway 5 of a duct-like configuration, and a damping passageway 6 of duct-like configuration connected parallel thereto. Both the connecting passageway 5 and the damping passageway 6 are formed by recesses in the outer part 8 extending circumferentially, which open axially at their mouths in the direction of the working chamber 1 and 2, respectively. The damping passageway 6 can be closed by a valve actuated by a signal. This valve is disposed at the one mouth of the damping passageway.

The rubber mount shown in FIG. 6 corresponds to the production form. It is characterized mainly by the fact that its part 9 shifts upward by the amount A relative to the outer part 8. The dimension A is selected such that, after the application of the load that is to be carried, the inner part 9 will be concentric with the outer part 8. Thus, both the inner part 9 and the outer part 8 have relative mobility of the same magnitude in all directions.

The outer part 8 is surrounded externally by a sheet-metal case 10 which closes off from the exterior the working chambers 1 and 2, the connecting passageway 5 and the damping passageway 6.

There has thus been shown and described a novel resilient mount for a piston engine which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a resilient mount for a piston engine, said resilient mount having elastically inflatable boundary walls which define two fluid-filled working chambers connected to one another by at least two parallel-connected passageways, the passageways including a damping passageway and at least one valve for selectively closing said damping passageway; the improvement wherein the damping passageway has a channel-like configuration and is dimensioned in such a manner that, when the piston engine is operated at idle speed, the enclosed fluid mass enters into a relative movement, vibrating in phase with the engine, with an amplitude that is greater than the amplitude of the movements of the engine, multiplied by the ratio of the displacement cross section of the inflatable walls and the cross sectional area of the damping passageway such that the dynamic stiffness of the resilient mount is substantially at a minimum, and wherein said mount includes means for closing said valve, thereby closing said damping passageway, when said engine is operated at a speed above said idle speed and for opening said valve, thereby opening said damping passageway, when said engine is operated at said idle speed.

2. The resilient mount according to claim 1, wherein the damping passageway has a cross sectional area of at least 100 square millimeters.

3. The resilient mount according to claim 1, wherein the working chambers are formed by recesses in a rubber body which is disposed in the radial space between two supporting and substantially cylindrical sleeves, one of which surrounds the other, and wherein the damping passageway is formed at least partially by a recess in the outer supporting sleeve.

4. The resilient mount according to claim 3, wherein the recess in the outer sleeve has at least one section which extends essentially in the circumferential direction.

5. The resilient mount according to claim 3, wherein the recess in the outer sleeve has at least one section which extends essentially in the longitudinal direction of such sleeve.

* * * * *